Feb. 24, 1959 R. L. LORENZ 2,874,773

PROGRAM UNIT FOR TIME RECORDER

Filed April 17, 1953 7 Sheets-Sheet 1

INVENTOR
RICHARD L. LORENZ by: H. H. Hulse
Atty

Feb. 24, 1959 R. L. LORENZ 2,874,773

PROGRAM UNIT FOR TIME RECORDER

Filed April 17, 1953

7 Sheets-Sheet 2

INVENTOR.
RICHARD L. LORENZ

BY H. H. Hulse

Atty

Feb. 24, 1959 R. L. LORENZ 2,874,773

PROGRAM UNIT FOR TIME RECORDER

Filed April 17, 1953 7 Sheets-Sheet 3

INVENTOR.
RICHARD L. LORENZ
BY H. H. Hulse
Atty

Feb. 24, 1959 R. L. LORENZ 2,874,773

PROGRAM UNIT FOR TIME RECORDER

Filed April 17, 1953 7 Sheets-Sheet 4

INVENTOR.
RICHARD L. LORENZ
BY H. H. Hulse
Atty

Feb. 24, 1959 R. L. LORENZ 2,874,773

PROGRAM UNIT FOR TIME RECORDER

Filed April 17, 1953 7 Sheets-Sheet 5

INVENTOR.
RICHARD L. LORENZ

BY H. H. Hulse

Atty

Feb. 24, 1959 R. L. LORENZ 2,874,773

PROGRAM UNIT FOR TIME RECORDER

Filed April 17, 1953 7 Sheets-Sheet 6

INVENTOR.
RICHARD L. LORENZ

BY H. H. Hulse

Atty

INVENTOR.
RICHARD L. LORENZ

BY H. W. Hulse
Atty 2,874,773

PROGRAM UNIT FOR TIME RECORDER

Richard L. Lorenz, Chicago, Ill., assignor to General Time Corporation, New York, N. Y., a corporation of Delaware Application April 17, 1953, Serial No. 349,420

12 Claims. (Cl. 161—21)

The present invention relates to a program unit and more particularly to a clock-driven mechanism for initiating one or more functions at preset times during the day.

It is a general object to provide a program unit particularly suitable for inclusion in workmen's in-and-out time recorders and the like.

It is an object of the present invention to provide a program unit which is more reliable and more precise than other units of similar type. It is a related object to provide a program unit which may be preset to any desired minute during the entire 24-hour day. It is another object to provide a program unit capable of initiating a function repeatedly and during any and all consecutive minute intervals throughout the day. It is still another object to provide a device of the above type in which all of the programmed functions may be operated at the same time. It is a further object to provide a program unit in which the desired function is triggered at the same time during each minute interval with a high degree of consistency.

It is another object to provide a program unit which produces a positive thrust to provide positive releasing of latches but which may be employed as motive power for performing various functions directly as well as by releasing of latches. It is nevertheless an object to provide a program unit which requires only a small amount of driving power.

It is another object of the invention to provide a program unit which, although of high accuracy, may be inexpensively constructed, using ordinary tolerances and without requiring a high degree of precision. It is a related object to provide a precise program unit which does not require any unusual machining operations.

It is a further object to provide a program unit having program clips which may be easily and quickly set up even by inexperienced personnel. It is a related object to provide a program unit using direct-reading scales in which the program setting may be quickly established and checked and which does not require use of setting charts, codes or the like, thereby reducing the possibility of error to a minimum.

It is an object of the invention in one of its aspects to provide a nòvel program disc construction and novel arrangement of program clips thereon to provide a high degree of rigidity while enabling the clips to be easily inserted and removed. It is another and related object to provide a novel clip construction which enables clips to be easily and quickly conditioned for use and which enables the size and number of clips to be reduced to a minimum.

It is an object to provide a program unit which is flexible in application and in which the number of program discs may be readily varied to suit the needs of the user.

It is a more detailed object of the invention to provide a program unit which has high inherent rigidity, which is shock and vibration resistant, and which is capable of operating continuously for long periods without adjustment or maintenance.

Other objects and advantages of the invention will become apparent upon reference to the attached detailed description and upon reference to the drawings, in which Figure 1 shows a program unit constructed in accordance with the invention positioned in a workmen's in-and-out time recorder.

Figures 1, 2:
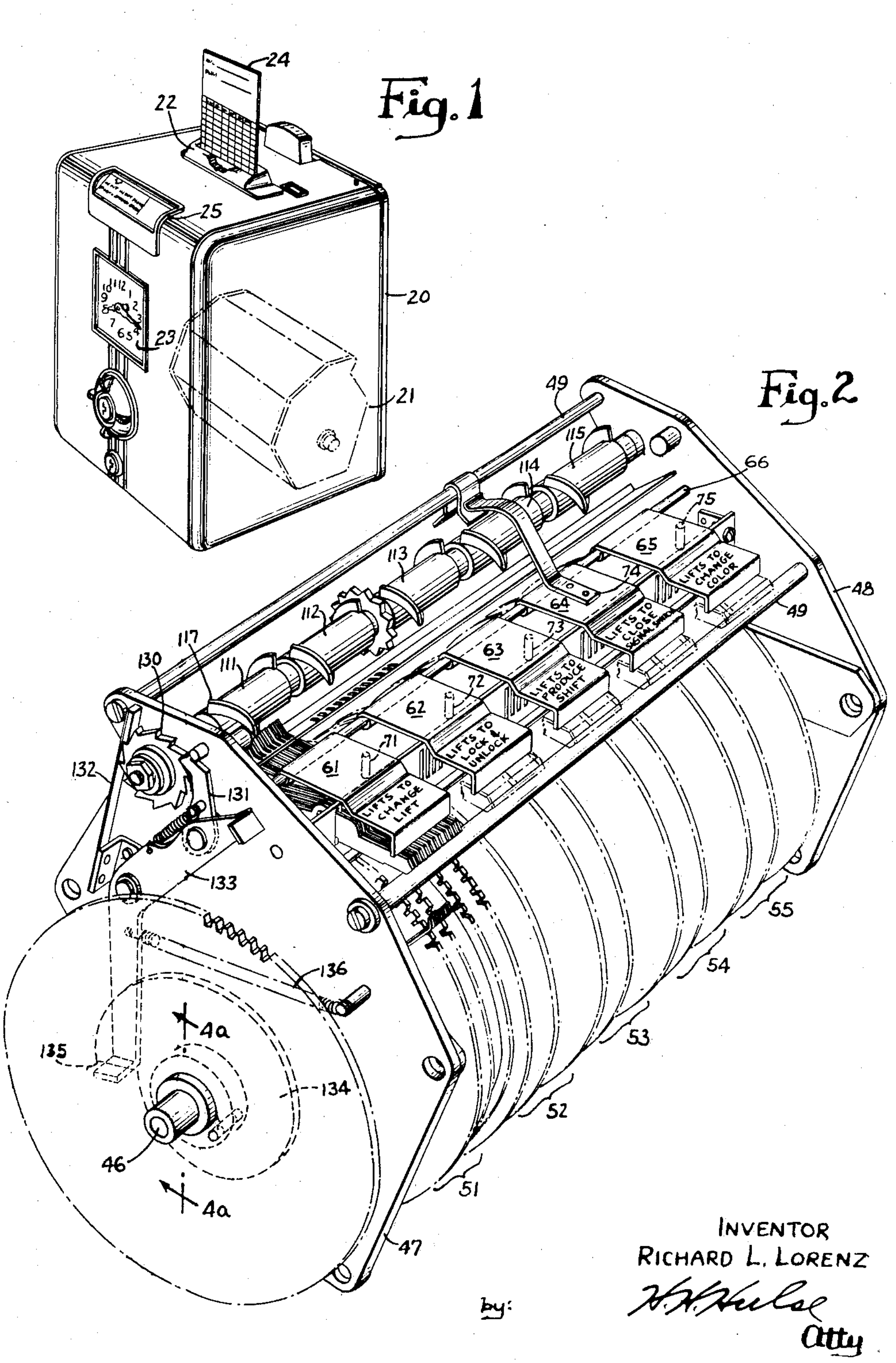
Fig. 2 shows the program unit in perspective.
Figures 4, 4A:
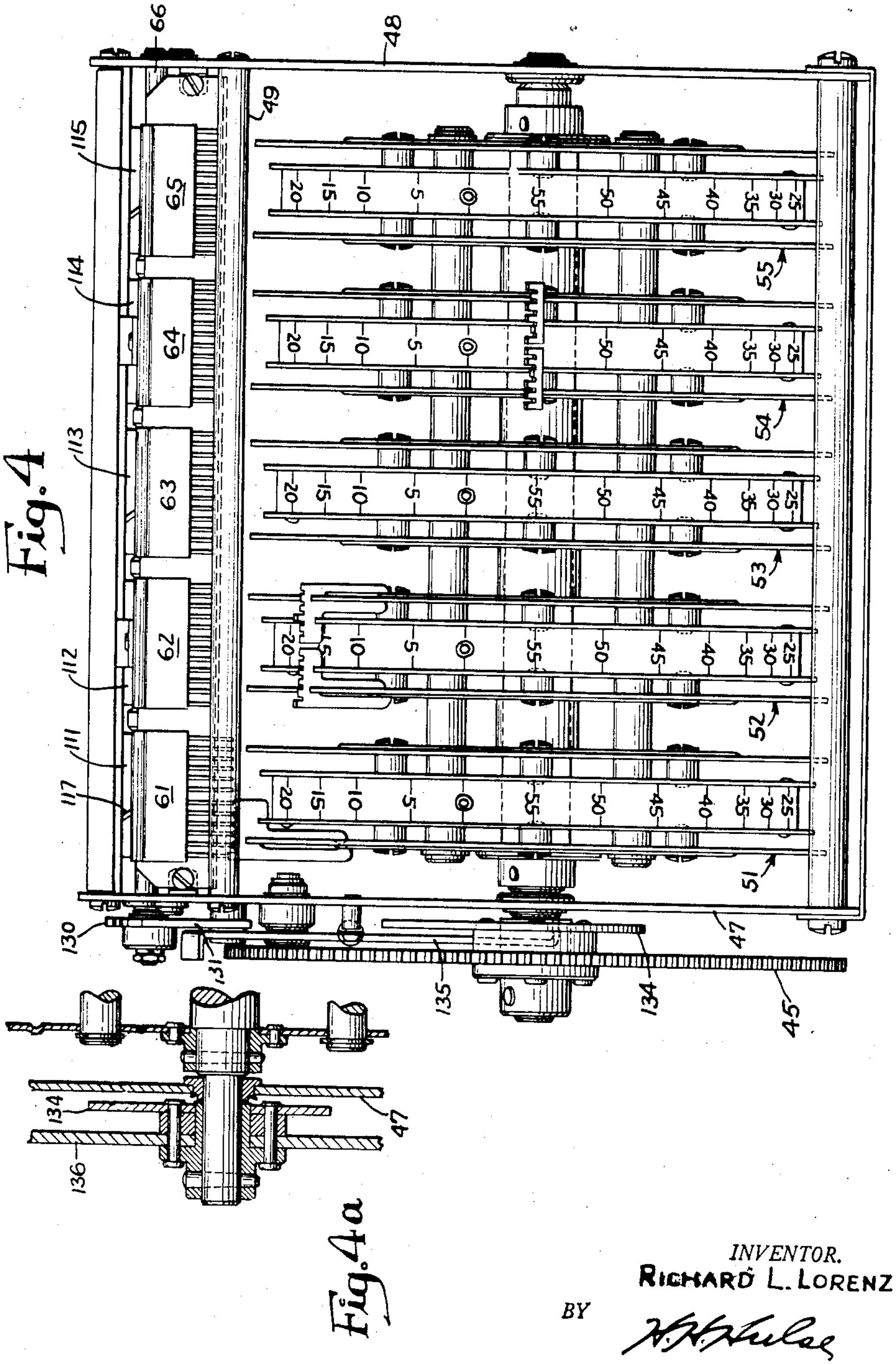
Fig. 4 is a view of the program unit in elevation.

Fig. 4*a* is a fragmentary section taken through the end of the program unit shaft and taken along the line 4*a*—4*a* in Fig. 2.

Figure 5:
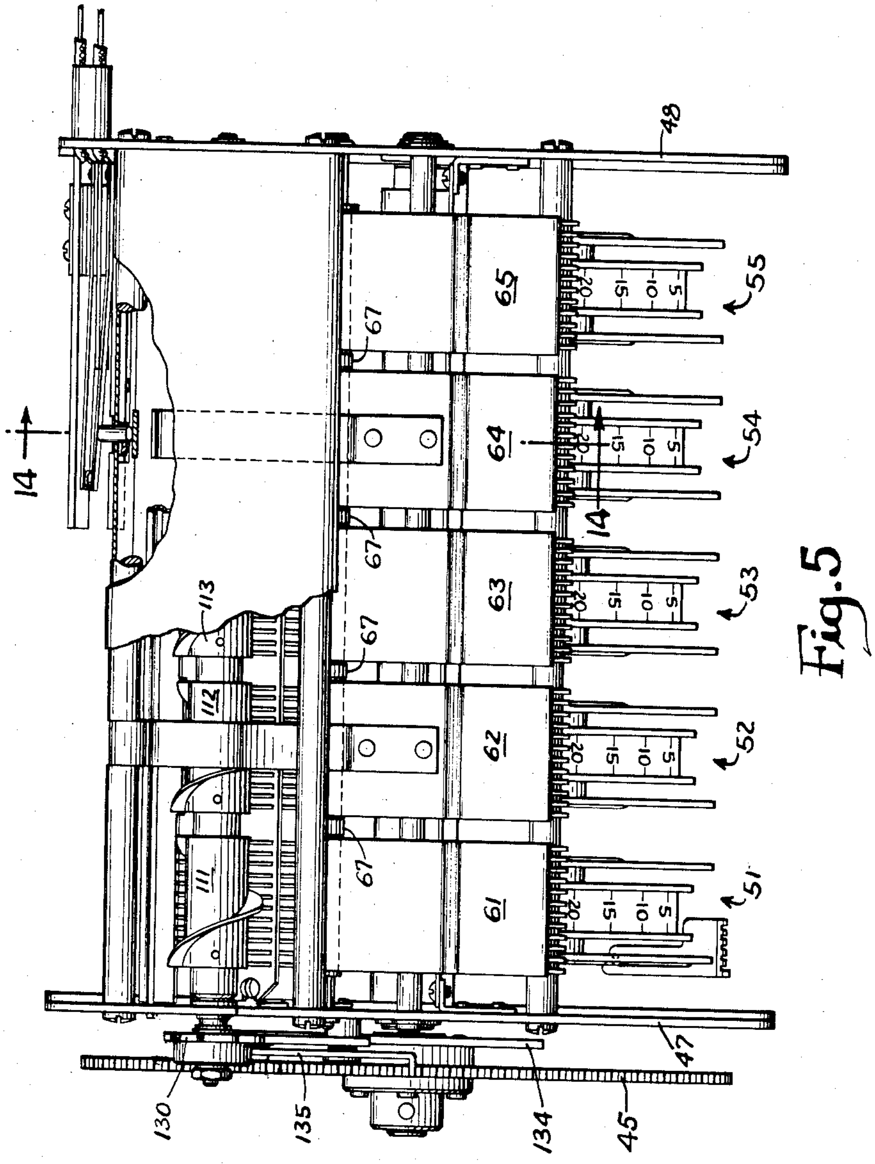

Fig. 5 is a top view of the program unit in Fig. 4.

Figures 6, 7, 8, 8A:
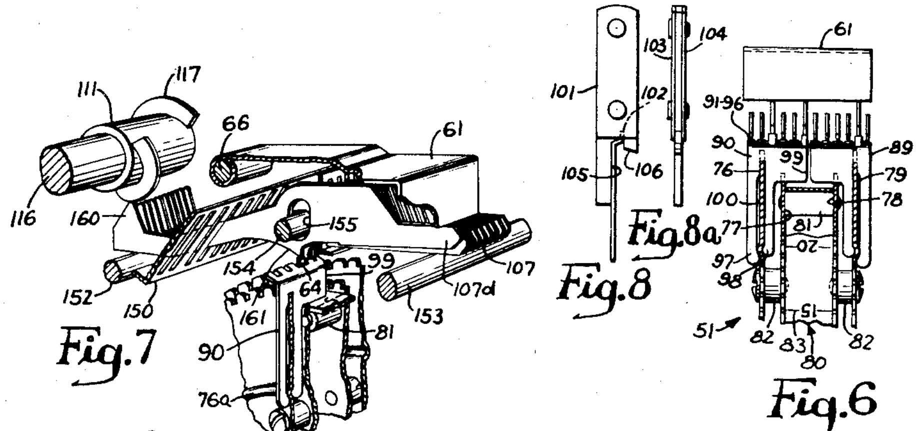

Fig. 6 is a fragmentary section of a program disc showing the positioning of program clips.

Fig. 7 is a fragmentary perspective in partial section showing the mechanism employed for raising one of the release plates.

Fig. 8 is a side view of a tool for bending the lugs on a program clip.

Fig. 8*a* is a view taken at right angles to Fig. 8.

Figures 9, 10, 11, 12, 14, 16:
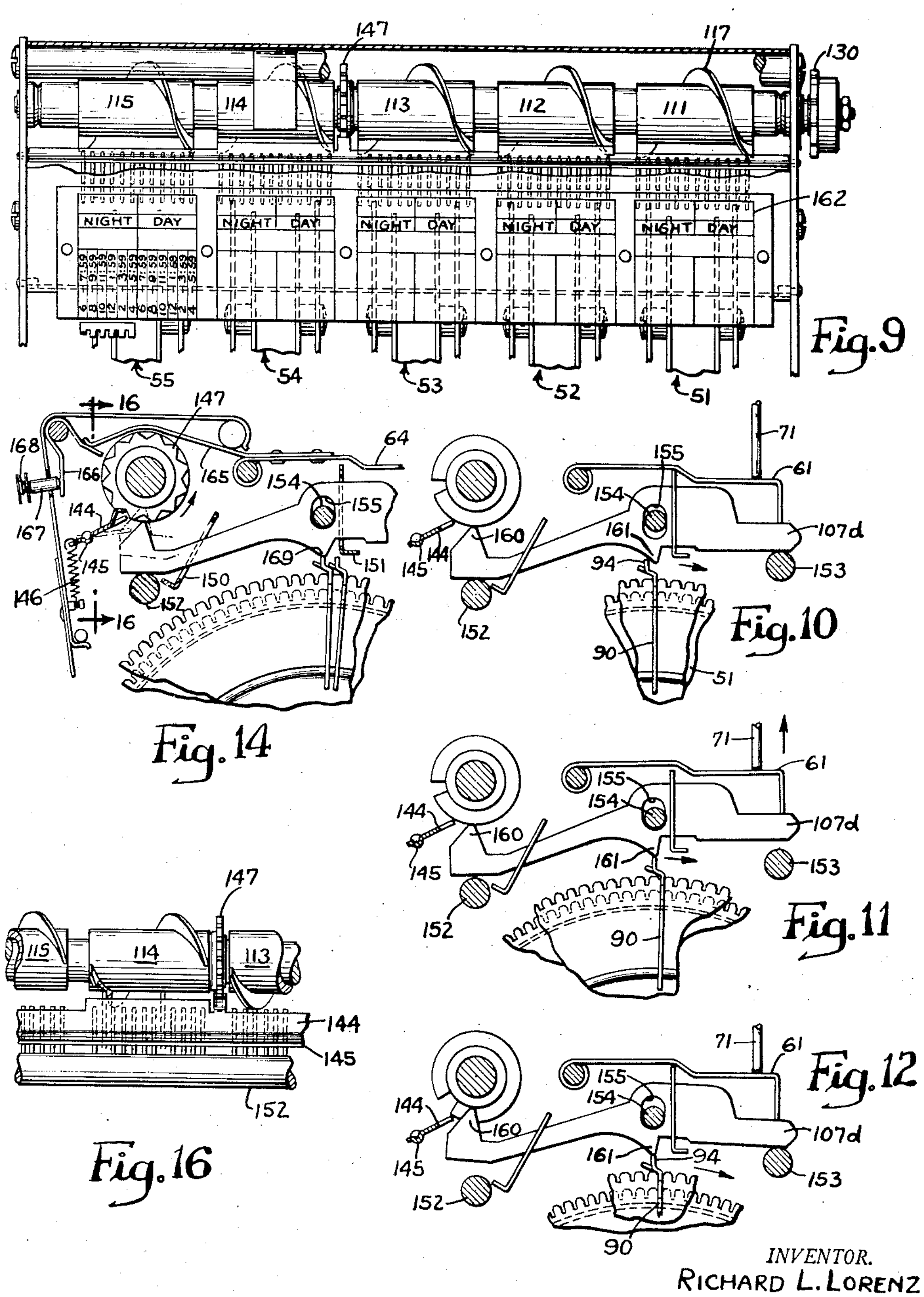

Fig. 9 shows the index plate used for setting the program discs.

Figs. 10 and 11 are stop-motion views showing actuation of one of the sensing fingers.

Fig. 12 is a view similar to Fig. 11 but illustrating the idle movement of the non-active sensing fingers.

Figure 13:
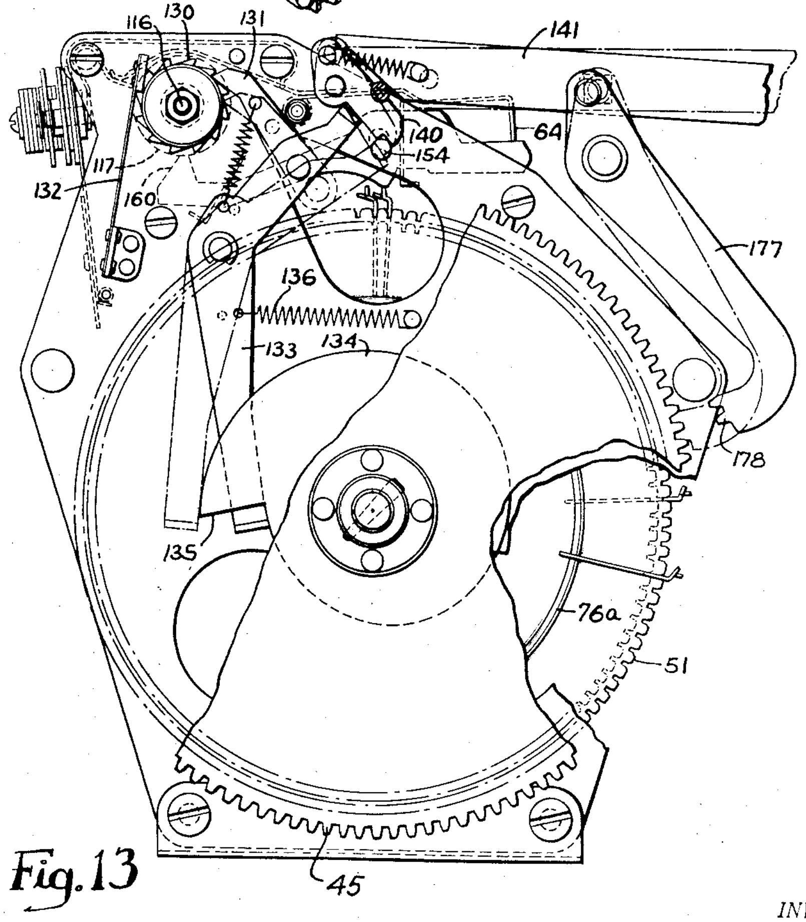

Fig. 13 is a left side elevation of the program unit.

Fig. 14 is a fragmentary section taken along the line 14—14 of Fig. 5.

Figures 3, 15:
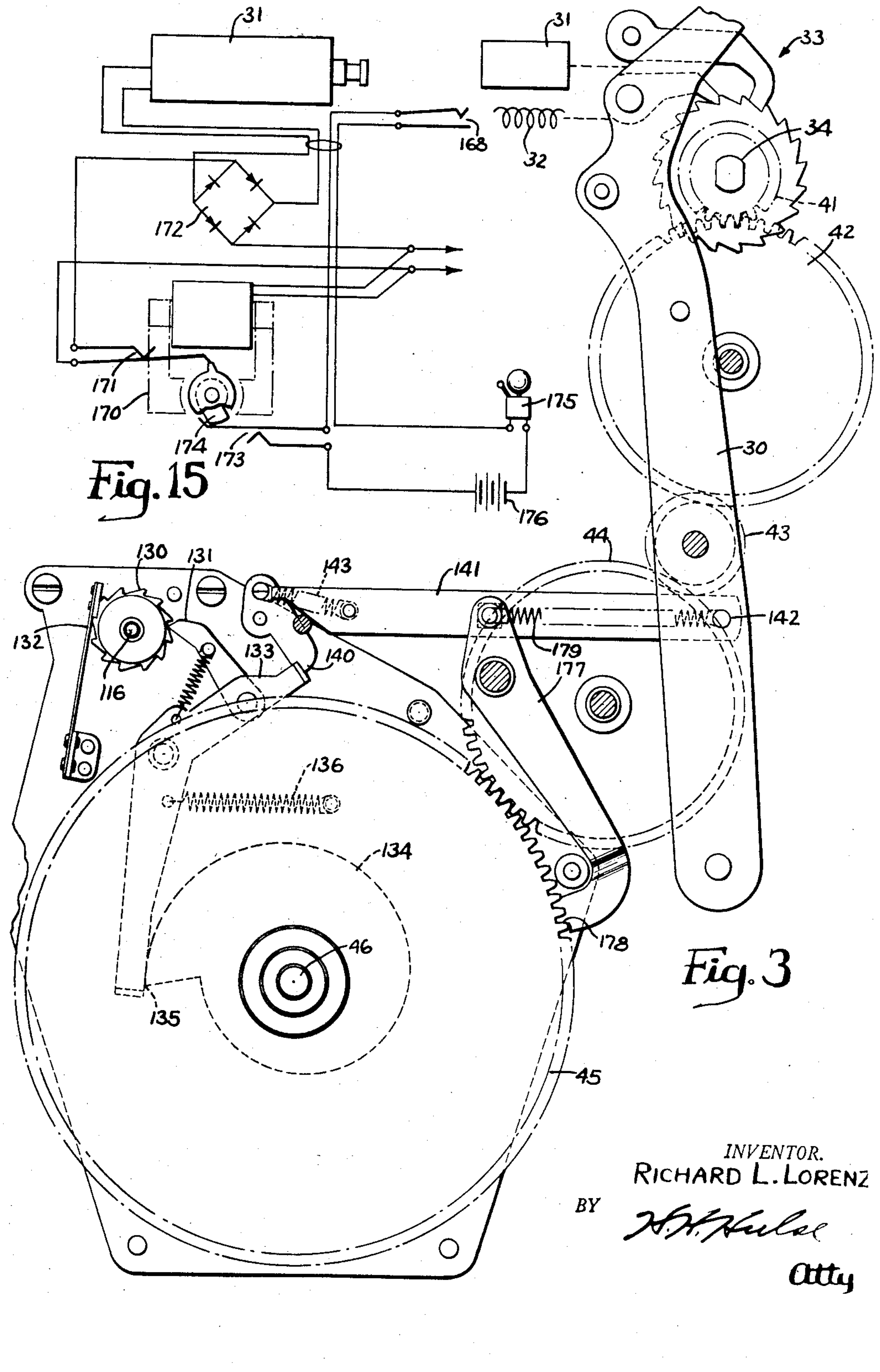
Fig. 3 shows the driving means for the program unit.

Fig. 15 is a diagram of a control and signalling circuit.

Fig. 16 is a fragment taken along line 16—16 of Fig. 14 and showing the clearing strip.

Figures 17, 19:
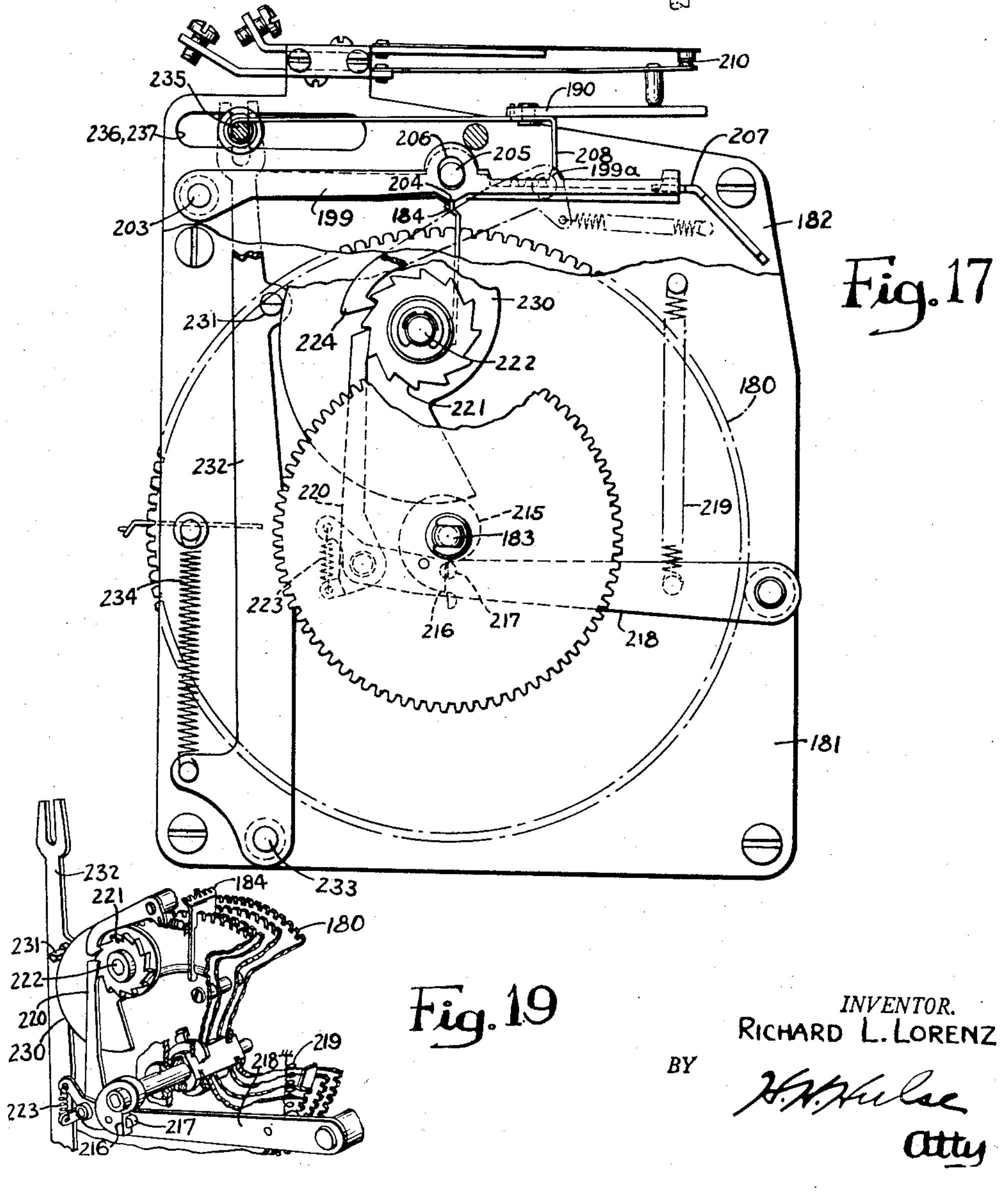

Fig. 17 is a side elevation of a modified structure embodying features of the present invention.

Figure 18:
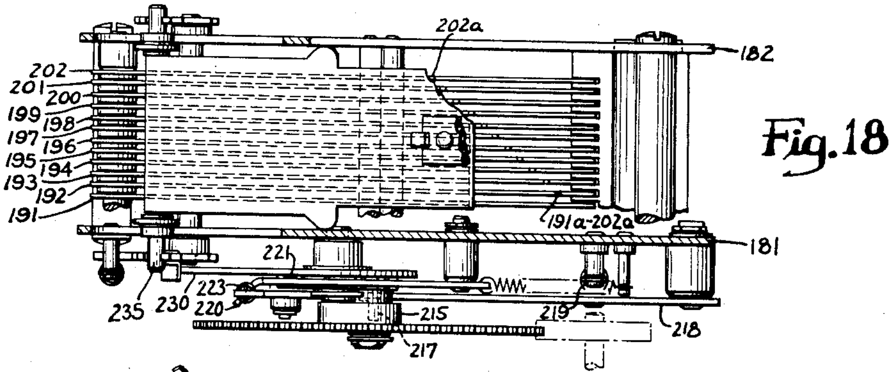

Fig. 18 is a top view of the device shown in Fig. 17.

Fig. 19 is a fragmentary perspective showing the cam mechanism of Figs. 17 and 18.

While the invention has been described in connection with two alternative constructions, it will be apparent to one skilled in the art that the invention in its broader aspects is not limited thereto, but includes such modifications and alternative constructions as fall within the spirit and scope of the appended claims.

In my copending application Ser. No. 349,419 filed April 17, 1953, now Patent No. 2,773,733, a workmen's in-an-out time recorder is described having a number of novel and distinctive features. One of the features of such recorder is that the various functions such as card "shift" and "lift," color change, as well as locking, unlocking, and signalling, are all performed by energy in the timing impulses supplied from a master clock. Only the printing operation is performed by power received from the commercial supply lines and means are provided for manual printing when this power fails.

As one of the features of the construction, the recorder includes a novel program unit, which is synchronously driven by the timing impulses received from the master clock and which includes a series of release plates which are operated either singly or in combination at any desired minute during the course of the 24-hour day. Since such program unit has features of general utility and is applicable to a wide variety of timing and signalling devices other than the in-and-out recorder, it is the purpose of the present application to describe the program unit in detail and to cover in the claims appended hereto the program unit including its driving mechanism.

Referring now to Figure 1, a recorder 20 is shown in perspective having a program unit embodying the present invention and which is indicated in dot-dash outline at 21. The recorder has a card receiver 22 and a clock face 23. To operate the recorder, it is sufficient to insert a card 24 into the card receiver, and when the card "bottoms," a printing magnet is energized and the time is imprinted in the proper space. The column in which printing occurs is shown by in-out indicator 25.

Prior to discussing the details of construction, it will be helpful to review the various functions which the program unit is called upon to control or initiate in the time recorder. The first of these functions is the shift, which controls the column in which the imprint occurs. At the beginning of a working day the shift mechanism causes printing to take place in the "in" column. As the normal check-out time approaches, the program unit operates to trigger the shift mechanism so that the type unit in the recorder is moved one column relative to the card. This function is performed at intervals throughout the day and normal time cards include approximately six columns.

The lift mechanism in the recorder determines the line on which imprinting takes place. In one common design of card, each line corresponds to a given day of the week, and the lift mechanism need only be operated once during the course of a 24-hour day.

Color change is a third function performed by the recorder referred to above. This mechanism causes all normal entries to be made in black or blue ink. Arrivals and departures at unusual times are imprinted in red so that the entry may be given special attention by the payroll department. The color change mechanism is operated by one of the release elements in the program unit and change from one color to the opposite color occurs each time that the release element in the program unit operates during the course of the day.

The period print or lock-out mechanism causes the recorder to be locked during the hours when no one is supposed to be working. Such locking and unlocking occurs at times preset in the program unit, switching to the opposite condition taking place at each actuation of the release element in the program unit. Signalling is the final function performed by the program unit when used in the above recorder, this being accomplished by a switch which is operated at predetermined times to sound a bell or other appropriate signal.

When used in a workmen's time recorder, the program unit is powered by energy in the timing impulses. Referring to Fig. 3, a timing lever 30 is used which is pivoted at its lower end and oscillated once each minute by a solenoid 31, return movement being accomplished by a return spring 32. On the return stroke the timing lever operates a ratchet mechanism 33, which drives a timing shaft 34. The program unit is in turn coupled to the timing shaft through gears 41—45, gear 45 being directly connected to the shaft 46 of the program unit. The shaft 46 is thus advanced one step each minute in unison with the return stroke of the solenoid.

The frame of the program unit includes two end plates 47, 48 (Fig. 2), which are connected by suitably spaced pillars or tie rods 49. Mounted on the shaft 46 in the program unit are a series of spaced program discs 51—55. Arranged above each of the discs are corresponding release plates 61—65 which are pivoted at one end on a shaft 66 and separated from one another by suitable spacers 67 (Fig. 5). As will be covered in the paragraphs which follow, each of the release plates 61—65 is swung upwardly by its associated disc at preset times during the course of the day. Arranged in the path of movement of the release plate are latch operators 71—75, or the like, which trigger the performance of the function corresponding to the label applied to each of the release plates.

Referring now to the structure of the disc 51 (Figs. 6 and 7), which will be taken as typical, it will be found that it includes four plates 76–79. Lying between the plates 77, 78, is a spacing ring 80. The latter, together with spacers 81 and appropriate rivets extending therethrough, produce a rigid box-like core. Additional spacers 82 are positioned between the inner and outer plates at spaced points, the outer plates being fastened to such spacers by appropriate screws. The central ring 80 carries a time scale 83 which is used by the operator in setting up the program.

For the purpose of operating the release plate 61 at a predetermined time, a clip is used which is inserted in notches provided at the periphery of the disc. Arrival of the clip at the reference point actuates a sensing finger which in turn lifts the plate 61. It is one of the features of the present unit that novel means are provided for converting a 2-hour cycle of the disc into a 24-hour time cycle. This is accomplished by providing twelve operating lugs at each clip position, together with a set of twelve sensing fingers and by providing means for causing each of the sensing fingers to be active over a predetermined 2-hour interval during the course of the 24-hour day. In this way it is possible to reduce the number of clip positions or notches around the periphery to 120, for operation at a selected minute, while still maintaining a high degree of accuracy.

In carrying out my invention, the clips are formed with a series of operating lugs spaced along the upper edge, two of the clips being indicated at 89, 90 in Fig. 6. The clip 90, by way of example, has operating lugs 91—96. The body of the clip includes two depending legs 97, 98, as well as a lateral offset 99. The legs 97, 98 are closely spaced to one another to form a slot 100 terminating in rounded end portions, the latter being radially offset from one another so as to snugly embrace the opposite walls of an annular groove **76*a* formed in the plate 76**. This causes a clip to be firmly seated in place with a snap or detent action.

It is one of the further features of the invention that the adjacent plate 77 includes alined notches for receiving the lateral offset 99 of the clip. The plate 77 is, as shown in the drawings, made somewhat smaller in diameter than the main supporting plate 76. The above construction provides firm anchoring at three distinct areas which are spaced from one another both axially and radially, thereby enabling the lugs to resist twisting or movement in any direction even when subjected to unusual forces.

In accordance with one of the aspects of the invention, the lugs 91—96 on the clip 90 are bendable and the clips are preferably supplied with the lugs bent downwardly into inactive position. In setting up the program selected lugs are bent upwardly into active position, in which the clips extend radially outward. The clip is fabricated in such a manner that the lugs are free to bend at their point of attachment without breaking, and yet stiff enough to resist the forces applied by the fingers, to be described, which ride in contact with them. Clips constructed in accordance with the above have permitted numerous bending operations without breaking off and without loss of reliability. Thus, it makes it possible to transfer performance of any function from one 2-hour period to another using the same clip.

To facilitate bending the clips, a bending fixture 101 may be employed as shown in Figs. 8 and 8*a*. This bending fixture has a slot 102 located between side walls 103, 104 into which a lug is inserted. The degree of bending is limited by a stop surface 105. The same fixture may be used for bending a lug down into inactive position, the degree of bending being limited by a second stop surface 106.

The clip 89 is simply a mirror image of the clip 90 and is supported in the same way on discs 78, 79. Each of the clips takes care of one of the two 12-hour periods forming a 24-hour day, and it will be understood that where the program requires operations in only one of such periods, only one clip is required.

For cooperating with the lugs on the program disc, a series of sensing fingers 107 are provided which are coupled to the release plate 61 and which are alined with and released by corresponding lugs on the clips 89, 90. Means are provided for rendering the fingers effective or "activating" them over 2-hour periods in sequence throughout the day. This is accomplished in the present instance by providing a fulcrum at one end of the sensing fingers which steps from finger to finger upon passage of time. This fulcrum is provided by fulcrum members 111—115 respectively which are mounted for rotation on a shaft 116. Taking the fulcrum member 111 (Fig. 7) by way of example, it will be noted that it includes a "diagonal" ridge or helix 117 which is positioned opposite each of the fingers 107 as the shaft 116 is rotated.

A step-down driving mechanism is provided for causing the shaft 116 to rotate through one step of movement at intervals of 2 hours during the course of the 24-hour daily cycle. This mechanism forms an integral part of the program unit and is driven by the same gear 45, which rotates the program discs. Referring again to Fig. 3, it will be noted that the shaft 116 carries a ratchet wheel 130 at its end which is engaged by a driving pawl 131 and a retaining pawl 132. The driving pawl 131 is mounted on a ratchet lever 133, which is driven by a cam 134 on the main shaft of the program unit. The cam 134 has a sharp drop-off point 135. The ratchet lever has a biasing spring 136 in which energy is stored during cam rotation.

During the passage of a 2-hour interval, the ratchet pawl 131 "takes a tooth." When the drop-off point is reached, the ratchet lever 133 is freed at its lower end for rotation in a counterclockwise direction, under the urging of the spring 136.

The structure thus far described would cause the shaft 116 to rotate through 1/12 of a revolution at each 2 hours whenever the drop-off point of the cam is reached. However, in accordance with one of the more detailed aspects of the invention, the power stroke is delayed until the beginning of the following minute. This insures that the change of fulcrum will take place and be completed prior to any force being applied to the fulcrum by one of the sensing fingers. To understand the delay mechanism reference is made to Figs. 3 and 13. Here it will be noted that the upper end of the ratchet lever 133 is engaged by a latch 140, which is coupled to a push rod 141. The right-hand end of the push rod 141 is connected to a pin 142 on the timing lever. The latch 140 is biased in a clockwise direction by a spring 143 so that under normal conditions it occupies a locking position at the upper end of the ratchet lever. However, when the push rod 141 moves to the left, the latch 140 rotates in a counterclockwise direction, thus freeing the ratchet lever 133. The latter then rocks counterclockwise as shown in Fig. 13 under the urging of the spring 136 to rotate the shaft 116 through one step of movement. This rotation causes an almost instantaneous change of fulcrum. During this change of fulcrum the program discs remain stationary and there is no load in any of the sensing fingers. Movement of the program discs is delayed until the solenoid 31 is deenergized, at which time the timing lever 30 is returned forcibly to its normal right-hand position under the urging of the return spring 32. In conventional timing systems the timing impulse is sent out beginning on the minute and lasts for approximately 2 seconds. Thus, there is almost a two-second delay between the transfer of fulcrum and the application of load to the fingers. The amount of delay is not of importance but the fact that there is a delay insures the desired operating sequence. This not only reduces friction at the point of fulcruming, but also avoids any tendency for the sensing fingers to be cammed sideways against the helical ridge 117 when the fulcrum member 111 rotates.

In order to insure that all of the sensing fingers are safely out of contact with the fulcrum members when the latter are rotated, a clearing blade 144 is used (Figs. 14, 16) which extends the width of the program unit and which is hinged along its outer edge at 145. A spring 146 is provided for normally biasing the clearing strip into a retracted position out of engagement with the ends of the sensing fingers. To lower the clearing strip during rotation of the fulcrum members, a star wheel 147 is used mounted on the same shaft 116 as the fulcrum members. It will be apparent that as the shaft 116 begins to rotate, the star wheel presses the clearing strip against the ends of the sensing fingers, thereby forcing all of the fingers down beyond the outer radius of the helical ridge 117. When the step of rotation is completed, the clearing strip under the urging of the spring drops back into an out-of-the-way position, so that all of the inactive sensing fingers may be free to undergo idle movement.

Referring to the sensing fingers in greater detail it will be seen that all of the fingers in the series 107 are of the same shape. They are supported for floating movement in a vertical plane by a projection through a pair of guide members 150, 151 (see Figs. 7 and 14), having vertical slots horizontally spaced from one another. All of the sensing fingers normally rest against horizontal posts 152, 153, which extend between the end plates of the frame. Endwise movement of the sensing fingers is prevented by stringing them on a post 154. Each of the fingers is, however, provided with an elongated vertical slot 155 which permits free vertical movement.

Taking the sensing finger **107*d* by way of example, it will be noted that it includes a fulcrum 160 at its left-hand end and a central cam portion 161 having a gradual approach but relatively sharp drop-off. The action of the finger 107*d* upon passage of a clip 90 having upwardly bent lug 94 is shown in Figs. 10 and 11. Fig. 10 shows the sensing finger in a position of rest. As the clip 90 approaches, the lug 94 cams the sensing finger upwardly into the position shown in Fig. 11. Such upward camming movement about 160 as a fulcrum is accompanied by upward movement of the release plate 61. This causes movement of the latch releasing member 71 or the like to initiate performance of the function. Subsequent rotation of the program disc 51 results in drop-off and the release plate 61** is restored to its initial position.

It is of interest to note that while the sensing finger **107*d* is active during a 2-hour period, it is not active thereafter, since it is without a fulcrum. The operation of the sensing finger 107*d* during the second 2-hour period is shown in Fig. 12, the fulcrum member having rotated through one step of movement. Here it will be noted that while the lug 94 on the clip 90 is effective to engage and to raise the sensing finger 107*d*, such movement simply results in raising the left-hand end of the sensing finger to the position shown. This is an idle movement and the release plate 61** is not raised. Such idle movement will of course occur in the case of each of the sensing fingers during eleven out of twelve rotations of the program disc.

Setting of the program clips is facilitated by a night-day index plate 162 (Fig. 9). This plate is ruled into vertical sections, each section being alined with one of the sensing fingers and corresponding to a 2-hour period. Using the index the operator determines the two-hour period during which he would like operation to occur and the corresponding lug is bent up into active position. Then, reference may be made to the time scale on the cylinder 80 at the center of each program disc, and the clip is then inserted at the correct minute position. This procedure may be clarified by practical example. Suppose operation of the first function were desired at 4:30 p. m. Referring to the index plate, it is found that this corresponds to the sixth lug position. This lug is bent upwardly and the clip is then inserted in the slot in the program disc corresponding to the 30-minute point on the scale.

In the case of the program disc 54 and its release plate 64, a switch is built into the program unit to accomplish electrical signalling. This switch and the actuating mechanism therefor is illustrated in Fig. 14. Riveted or otherwise fastened to the release plate 64 is a rearwardly extending arm 165. Mounted at the end of this arm is a bell crank 166. The bell crank has a downwardly extending arm which bears against a plunger 167, which in turn presses against the contacts 168 of the switch. It will be apparent that when the release plate 64 is raised, the bell crank will be rotated clockwise, thereby closing the contacts. The sensing fingers used for this purpose are similar to the sensing fingers previously described. If desired, the cam portion which engages the program clip may be slightly elongated as shown at 169.

For the purpose of limiting the duration of the controlled signal, the switch contacts 168 may be placed in series with duration-controlling contacts at the master clock. A typical control circuit for this is shown in Fig. 15. Here a synchronous motor 170 is used for control purposes. Closure of the impulse contacts 171 applies an alternating voltage to a rectifier 172, which in turn supplies a timing impulse to the solenoid 31. The duration contacts are indicated at 173, and are controlled by a cam 174 in the synchronous motor. The circuit includes a signal device 175 and a source of current 176. Closure of the contacts 168 in the program unit transfers control to the duration contacts 173 and the signal is operated during a precisely controlled interval.

In order to avoid any inaccuracy which might be caused by play in the gears in the train 41—45, inclusive, means are provided for positively positioning the gear 45 on the program unit each time that it changes position. This is accomplished by a positioning lever 177 which is connected to the push rod 141 and which carries teeth 178 at its lower end (see Fig. 3). These teeth are carefully machined to wedgingly fit the gear teeth. The lever 177 is biased into the position shown by a spring 179.

In operation, movement of the timing lever 30 at the beginning of a minute interval disengages the positioning lever (Fig. 13). The discs of the program unit are therefore free to turn when the timing lever moves to the right under the urging of spring 32 to execute a power stroke. Sufficient movement of the gear 45 will occur so that when the positioning lever is lowered into contact with the gear it will ride on the outer surface of the gear teeth while the movement is completing. The positioning lever will then fall into place so that the discs of the program unit are positively held in position until a subsequent advancement occurs.

*Alternative construction*

While the preferred embodiment of the invention has been described above, it will be apparent to one skilled in the art that the invention may be embodied in various alternative constructions and one of these constructions is shown by way of example in Figs. 17–19. The modified form of the invention employs the same program discs and the same clips as discussed above. The difference between the two constructions lies primarily in the means employed for selecting the active sensing finger. It will be noted that the helical fulcrum member used in the previous embodiment has been dispensed with and the fulcrum selecting element is in the form of a straight edge rather than in the form of a helix. This will be made clear by reviewing the modified structure in detail.

In the drawing only one program disc 180 has been shown for the sake of simplicity. It is mounted on frame plates 181, 182 and rotates on a shaft 183. This program disc is of the same construction as previously described and carries a program clip 184 on its periphery.

The release member of the program unit is in the form of a contact plate 190, which corresponds to the release plates 61—65 in the previous embodiment. Interposed between the program disc and the contact plate are a series of sensing fingers 191—202. These sensing fingers are pivoted at their left-hand ends for rocking on a common shaft 203. The construction of each of the sensing fingers will be understood by considering a representative sensing finger 199. This finger has a cam portion 204 which is engaged by a corresponding lug on the program clip 184. The fingers are guided for vertical movement by a comb 207 and endwise movement is restricted by a cross member 205, which is received in an elongated hole 206.

In the present embodiment of the invention, the sensing fingers 191—202 are provided with fulcrums which are diagonally offset from one another and which are in the form of upraised lugs **191*a*—202*a*. For cooperating with the lugs the contact plate 190 is provided with a downwardly extending edge portion 208**, which is moved from one of the lugs to the next at the expiration of each 2-hour interval during the course of a 24-hour day.

It will be apparent that when the contact plate is in the position shown in Fig. 17, the sensing finger 199 is in the activated position. When the active lug on the program clip which is alined with the sensing finger 199 rotates around into the reference position, upward movement of the sensing finger occurs, causing upward movement of the contact plate 190. Contacts 210 are provided which are closed during the upward movement of the contact plate. These contacts may be connected to a signal or the like as shown in Fig. 15. The non-activated sensing fingers having no fulcrum, simply move idly up and down.

As shown in the drawing, means are provided for drawing the contact plate 190 to the left one step each two hours. This movement originates in a 2-hour cam 215 which is mounted on the shaft 183 and has a drop-off point 216. Cooperating with this cam is a cam follower 217 which is mounted on a cam follower lever 218. During the course of rotation of the cam, energy is stored in a spring 219. Mounted at the left-hand end of the cam follower lever 218 is a 2-hour driving pawl 220, which engages a ratchet wheel 221 mounted on a counter shaft 222. The pawl is maintained in contact with the ratchet wheel by a spring 223. Retrograde movement of the ratchet wheel is prevented by a retaining pawl 224.

Coupled directly to the ratchet wheel 221 is a sensing finger selecting cam 230. This cam makes one revolution every 24 hours, and is advanved one step every 2 hours by means of the 12-toothed ratchet wheel 221. Riding on the surface of the cam 230 is a cam follower 231, which is mounted on a selector lever 232. The selector lever is pivoted in the frame at its lower end at 233 and is biased against the cam by a spring 234.

At its upper end, the selector lever 232 carries a guide rod 235, which is guided for broadwise movement by guide openings 236, 237. The guide rod engages the left-hand edge of the contact plate 190 and positions it for successive engagement with the lugs on the sensing fingers.

While the operation of the device shown in Figs. 17–19 will be apparent from the foregoing description, it may be briefly summarized as follows: It is assumed that the shaft 183 is driven by a timing mechanism similar to the drive shaft in the earlier embodiment. Since such shaft has a 2-hour cycle, the ratchet wheel 221 is stepped forwardly once every two hours. This causes the selector lever to be shifted to the left from one of the lugs **191*a*—202*a*** to the next. Thus each of the fingers is made responsive to its respective lug on the program disc for a period of two hours. At the completion of the 24-hour cycle, drop-off of the cam follower 231 occurs, restoring the contact plate 190 to its right-hand position for the beginning of a cycle.

The above arrangement not only utilizes a number of the inventive features of that previously described, but has the further advantage that it may be more cheaply manufactured.

The two embodiments of program unit described above are distinguished by their accuracy and consistency. Operation of any of the functions may be initiated at any desired minute during the course of the 24-hour day. Because of the inherently rigid construction of the program discs and the positive means which has been provided for mounting the program clips, all functions are performed within the minute interval with a high degree of precision. A forceful thrust is applied to the release plates so that the devices may be utilized for performing many different operations by direct action and without a separate source of the driving torque. The load imposed upon the main shaft of the program unit is nevertheless low, enabling the program unit to be advanced by solenoids or synchronous motors of conventional type having relatively low power capabilities.

The program unit is easily and quickly set directly in terms of time and without recourse to tables or charts. Setting is made particularly easy since the operating lugs are easily bent upwardly and need not be broken off as in more conventional devices.

In addition to the above advantages the device is constructed of parts which are inexpensive and easily fabricated and no special tools or machine operations are required. Operation is straightforward and no critical adjustments are necessary. As a result program units of the type disclosed can be expected to operate dependably over long periods of time without substantial maintenance.

I claim:

1. In a program unit for a time recorder or the like having a timing shaft and a function-performing mechanism, the combination comprising a disc coupled for rotation with said timing shaft, said disc having provision for mounting a plurality of lugs side by side, a release member adapted for coupling to said function-performing mechanism, a plurality of sensing fingers positioned in the respective paths of movement of said lugs and arranged to operate said release member, said sensing fingers being floatingly mounted and normally incapable of operating said release member when contacted by said lugs; a helix member having a helical ridge thereon for providing a fulcrum for said sensing fingers to render same effective to operate said release member, and means for advancing said helix member for engagement of said fingers in succession and for a time interval which corresponds to the period of rotation of said disc.

2. In a program unit for a time recorder or the like having a timing shaft and a function-performing mechanism, the combination comprising a program disc coupled for rotation with said timing shaft, said disc having provision for mounting a plurality of lugs side by side, a release member adapted for coupling to said function-performing mechanism, a plurality of sensing fingers positioned in the respective paths of movement of said lugs and arranged to operate said release member, a movable member extending transversely across said sensing fingers and so constructed and arranged as to provide a point of fulcruming for said fingers in sequence as the movable member is steppingly moved, and means for stepping the movable member from one finger to the next and for providing a dwell period which corresponds to the period of rotation of said program disc.

3. In a program unit for a time recorder or the like having a timing shaft and a function-performing mechanism, the combination comprising a program disc coupled for rotation with said timing shaft, said disc having provision for mounting a plurality of lugs side by side, a release member adapted for coupling to said function-performing mechanism, a plurality of sensing fingers positioned in the respective paths of movement of said lugs and arranged to operate said release member, a movable member extending transversely of said fingers, said movable member and said fingers having a mutual contact ridge arranged so that movement of said movable member causes the effective point of fulcruming to be transferred from finger to finger as the movable member is advanced, and means for moving the movable member so that the fingers are sequentially conditioned to operate said release member over intervals corresponding to the period of rotation of the program disc.

4. In a program unit for a time recorder or the like having a timing shaft and a function-performing mechanism, the combination comprising a program disc coupled for rotation with said timing shaft, said disc having provision for mounting a plurality of lugs side by side thereon, a release member adapted for coupling to said function-performing mechanism, a plurality of sensing fingers arranged in alinement with said lugs and having wiping engagement therewith, said release member lying in the path of movement of said sensing fingers, said sensing fingers being floatingly mounted so that they are normally incapable of operating said release member, a helix member having a helical ridge thereon for providing a fulcrum for said sensing fingers in succession, and means for rotating said helical member step by step and providing a dwell time which corresponds to the period of rotation of said program disc.

5. In a program unit for a time recorder or the like having a timing shaft and a function-performing mechanism, the combination comprising a disc coupled for rotation with said timing shaft, said disc having means for mounting a plurality of lugs side by side, a release member adapted for coupling to said function-performing mechanism, a plurality of sensing fingers arranged in alinement with the lugs on said clip and having wiping engagement therewith, said release member having an edge extending across all of said sensing fingers, said sensing fingers each being provided with an upraised lug, transport means for moving the edge of said releasing member longitudinally along said sensing fingers, said edge and said lugs being angularly arranged with respect to one another so that the edge is brought successively into engagement with said lugs and so that the sensing finger having the engaged lug is solely effective to operate said release member, and means for actuating said transport means for one step of movement following each complete revolution of the disc.

6. In a program unit for a time recorder or the like having a timing shaft and a function-performing mechanism, the combination comprising a disc coupled for rotation with said timing shaft, said disc having means for mounting a plurality of lugs side by side, a release member adapted for coupling to said function-performing mechanism, a plurality of sensing fingers arranged in the path of movement of said lugs, said release member having a relatively sharp edge portion extending across all of said sensing fingers, said sensing fingers each being provided with an upraised lug, transport means for shifting the edge of said releasing member longitudinally along said sensing fingers, said edge and said lugs being angularly arranged with respect to one another so that the edge is brought successively into engagement with said lugs and so that the sensing finger having the engaged lug is solely effective to operate said release member, said transport means including a step-down drive connection with said disc so that the release member is shifted one step following each complete revolution of the disc.

7. In a program unit for a time recorder or the like having a timing shaft, a disc assembly coupled for rotation with said timing shaft comprising, in subcombination, first and second circular plates having means for spacing them rigidly adjacent one another, said plates having unlike diameters, the peripheries of said plates being provided with equally spaced radial notches having the same radial depth and with the notches in the two plates in respective alinement with one another, and a program clip arranged for reception in an alined pair of said notches, said program clip having axially spaced legs which extend radially inward on one of said plates for embracing the same and having an offset portion for engaging the notch in the remaining plate, and means providing a detent engagement between the ends of the legs of the clip and the engaged walls of said first plate.

8. For use in a program unit having a radially slotted program disc and having a plurality of sensing fingers arranged edgewise in a spaced series with respect to the periphery of said disc, a program clip comprising a flat plate of metal adapted along its lower edge for engagement with a predetermined slot in said disc and having an upper edge portion which extends axially for wiping presentation to the edges of said sensing fingers, the upper edge portion of said clip having a plurality of integrally formed lugs thereon for registering with said sensing fingers, said lugs being bendable from an inactive inwardly bent position into an active position in which they extend radially outward from said disc, thereby wipingly to engage corresponding ones of said sensing fingers, said clip having an integrally formed pair of legs for engaging the opposite walls of said disc and for preventing twisting movement of the clip relative to the plane of said disc.

9. In a program unit for a time recorder or the like having a timing shaft and a function-performing mechanism, the combination comprising a program disc coupled for intermittent rotation with said timing shaft, a removable clip mounted on said program disc, said clip having a plurality of lugs alined with the disc axis and extending radially outward, a release member coupled to said function-performing mechanism for operating the same, a plurality of normally inoperative sensing fingers associated with said disc and positioned in the respective paths of movement of said lugs for engagement thereby, said release member being arranged for operation by any one of said sensing fingers when the finger is operated, means progressively shiftable from one sensing finger to the next in unison with successive complete rotations of said disc for alternately conditioning each successive finger for operation when it is engaged by one of said lugs, and means for causing shifting of said shiftable means when said disc is stationary.

10. In a program unit for a time recorder or the like having a timing shaft and a function-performing mechanism, the combination comprising a program disc coupled to said timing shaft for intermittent rotation therewith, a removable clip mounted on said program disc, said clip having a plurality of lugs alined with the disc axis and extending radially outward, a release member coupled to said function-performing mechanism for operating the same, a plurality of normally inoperative sensing fingers associated with said disc and positioned in the respective paths of movement of said lugs for engagement thereby, said release member being arranged for operation by any one of said sensing fingers when the finger is operated, and means progressively shiftable from one sensing finger to the next in unison with successive complete rotation of said disc for alternately conditioning each successive finger for operation when it is engaged by one of said lugs.

11. In a program unit for a time recorder or the like having a timing shaft and a function-performing mechanism, the combination comprising a program disc coupled to said timing shaft for intermittent rotation therewith, a removable clip mounted on said program disc, said clip having a plurality of lugs extending radially outward and alined with the disc axis, a release member adapted for coupling to said function-performing mechanism, a plurality of sensing levers associated with said disc and positioned in the respective paths of movement of said lugs, said release member being arranged for operation by any one of said sensing levers, means including a support member mounted for progressive shifting from one sensing lever to the next to provide a point of support for said levers successively thereby rendering them operative in sequence, and means including a stop motion device coupled to said shaft for causing said support member to be shifted in steps synchronized one-to-one with the successive rotations of the disc.

12. In a program unit for use in a time recorder or the like having a magnetic actuator and a timing shaft steppingly advanced thereby, the combination comprising a disc drive shaft for coupling to said timing shaft, a program disc mounted on said drive shaft, a set of sensing fingers arranged in edgewise presentation to said program disc, said program disc having at its periphery a plurality of axially spaced lugs each alined with an individual one of said sensing fingers to produce movement of such sensing finger when the associated lug is rotated to operating position, a function producing mechanism controlled by said sensing fingers, and means for sequentially conditioning said fingers for transmitting said movement to said mechanism with a different finger being conditioned for each revolution of said drive shaft, said means including both a spring pressed operating member tensioned by said drive shaft for powering the sequential conditioning operation and a latch for releasing said operating member at an instant of time when the drive shaft is at rest.

References Cited in the file of this patent

UNITED STATES PATENTS

| | | |
|---|---|---|
| 1,172,080 | Voigt | Feb. 15, 1916 |
| 1,317,109 | Sohm | Sept. 23, 1919 |
| 1,772,786 | Sokoloff | Aug. 12, 1930 |
| 1,791,927 | Geiger | Feb. 10, 1931 |
| 2,580,787 | Johnson | Jan. 1, 1952 |
| 2,633,914 | Miller | Apr. 7, 1953 |
| 2,695,342 | Junghans et al. | Nov. 23, 1954 |